United States Patent Office 3,344,090
Patented Sept. 26, 1967

3,344,090
VINYL ANTHRAQUINONE REDOX-RESINS AND A PROCESS FOR THEIR PRODUCTION
Georg Manecke, Berlin-Dahlem, and Winfried Storck, Berlin-Steglitz, Germany, assignors to Max-Planck-Gesellschaft zur Forderung der Wissenschaften e.V., Gottingen, Germany, a corporation of Germany
No Drawing. Filed July 30, 1963, Ser. No. 298,550
Claims priority, application Germany, Aug. 22, 1962, M 53,981
18 Claims. (Cl. 260—2.2)

The invention relates to cross-linked redox-resins and to a process for their production by copolymerizing vinyl anthraquinones with other monomers and compounds which comprise more than one vinyl group.

It is known that the polymerization of 2-vinyl anthraquinone leads to products with reversible redox properties. The polymeric products are hydrophobic and insoluble in the conventional organic solvents, but the reduced form is dissolved in alkali. Sulfonation of the poly-2-vinyl anthraquinone thus produced leads to the degradation of the polymer. Copolymerization in substance, for example, with styrene, produces resins with a maximum capacity of only about 1 mequiv./g.; this is caused by the limited solubility of 2-anthraquinone in styrene. The copolymerization of vinyl anthraquinones with divinyl benzene in substance or in solution likewise leads only to nonuniform resins of low redox capacity (about 1 mequiv./g.).

Copolymerization and cross-linking in various solvents, such as benzene, toluene and alcohols, usually leads only to polymers in powder form and with low yields. This is because of the low solubility of the copolymers of vinyl anthraquinones in the solvents employed. It has now been found that, when copolymerizing vinyl anthraquinones with other polymerizable monovinyl compounds in dimethyl sulfoxide, advantageously with the simultaneous use of monomers having a cross-linking action, redox resins are formed which are of homogeneous structure and are mechanically stable.

Using this process, the copolymerization preferably takes place at temperatures from 100 to 200° C. The vinyl anthraquinones are preferably 1-vinyl and 2-vinyl anthraquinones as well as their substitution products. As copolymerizable monovinyl compounds, there are advantageously used aromatic monovinyl compounds, for example, styrene, methyl styrene, ethyl styrene and chlorostyrenes, while aromatic divinyl and polyvinyl compounds such as divinyl benzene or trivinyl benzene, are used as monomers with a cross-linking action. It is expedient in this process that the ratio between vinyl anthraquinone and the sum of the comonomers does not exceed 2:1. The copolymerization in dimethyl sulfoxide may be carried out in the presence of peroxides, i.e. of benzoylperoxide. Using the process according to the invention, resins which have a capacity of 3.5 mequiv./g. and higher are obtained in practically quantitative yield.

Copolymerization in dimethyl sulfoxide without simultaneous cross-linking leads to very nonuniform mixtures of polymers of different composition. Ion-exchanging groups, such as sulfonic acid, carboxylic acid or phosphonic acid groups, can, if required, be introduced by known processes into the polymers which are obtained. Macroporous exchange resins, which have the so-called sponge structure, can be obtained by adding non-solvents to the polymerization medium, i.e. by adding organic liquids which certainly dissolve or gel the monomers, but not the polymers. The sponge structure is maintained even after subsequent chemical reactions such as saponification or sulfonation. As nonsolvents may be used alcohols, lower alkylester, ethers and aliphatic hydrocarbons, especially butylacetate, propylalcohol and heptane are employed.

The resins have relatively good chemical stability and show the lowest normal potential yet achieved. The dependence on pH is not disturbing, since the resins are stable at pH 14 up to a value of about $E'_0 = -700$ mV. By variation of the pH, it is thus possible to vary the reduction effect within wide limits. By this means, a new field of application for redox resins is disclosed. Compared with condensation resins ($E_0 = $ about $+700$ mV.) comprising these redox systems, these resins show a much lower redox potential which was not immediately to be expected according to the existing state of the art.

The following examples show the production of polymers and copolymers which are based on 1-vinyl and 2-vinyl anthraquinones. Example 3 shows the production of a polymer having a sponge structure, butyl acetate being used as nonsolvent.

Example 1

20 mmol. of 2-vinyl anthraquinone (4.684 grams), 3.2 mmol. of divinyl benzene (0.417 gram = 8 mol. percent), 2.08 mmol. of ethyl styrene (0.275 gram) and 14.75 mmol. of styrene (1.532 grams) were sealed in vacuo in a glass ampoule with 10 ml. of freshly distilled dimethyl sulfoxide after repeated degasification and dissolved at 140° C. The ampoule was then heated for 165 hours at 140° C. in a drying chamber. After cooling, the dark brownish red, hard rod thus obtained was comminuted, extracted in a Soxhlet apparatus with methanol and the brownish yellow pieces were dried in vacuo at 50° C. The hard and brittle product was broken and screened.

Example 2

4.7 grams of 2-vinyl anthraquinone, 0.42 gram of divinyl benzene, 0.275 gram of ethyl styrene and 1.54 grams of α-methyl styrene were sealed in vacuo in a glass ampoule with 10 ml. of freshly distilled dimethyl sulfoxide after repeated degasification and dissolved at 140° C. The solution was heated for 165 hours at 140° C. in a drying chamber. After cooling, the dark brownish red, hard rod obtained was comminuted, completely extracted in a Soxhlet apparatus with methanol and the brownish yellow pieces were dried in vacuo at 50° C. The hard and brittle product was broken and screened.

Example 3

7.50 mmol of 2-vinyl anthraquinone (1.757 grams), 10.31 mmol. of divinyl benzene (1.342 grams = 12.4 mol. percent), 6.69 mmol. of ethyl styrene (0.884 gram), 100 mg. of benzoyl peroxide and 58.00 mmol. of styrene (6.040 grams) were sealed in vacuo in a glass ampoule with 20.0 ml. of dimethyl sulfoxide-butyl acetate mixture (5:95) after degasification, dissolved at 100° C. and polymerized at 100° C. for 168 hours. The polymer had a macroporous sponge structure.

The copolymers obtained can be sulfonated like polystyrene giving resins having limited swelling power in water and which show a reversible redox behaviour. They are stable over the entire pH range, both in the oxidized and reduced form. They have a behaviour similar to ordinary sulfonated polystyrene resins. They are not completely resistant to relatively long action of oxidizing agents (24 hours and longer) with an $E_0 > 0.7$, but are slightly degraded to compounds soluble in alkali when in the reduced form. When the reduced form is treated in the K-form or H-form with air $H_2O_2$ is formed, but this does not attack the resin with degradation.

The following examples shows the production of a sulfonated polymer.

Example 4

5.47 grams of resin (grain size 0.1–0.5 mm.) were gelled for 1 hour in 50 ml. of dichlorethane, and thereafter, at room temperature, a mixture of 17.5 ml. of chlorosulfonic acid and 5.5 ml. of dichlorethane was added dropwise within 30 minutes. After stirring for 24 hours at the same temperature, the substance was suction-filtered and the resin was carefully washed with dichlorethane. The resin was then heated with water for hydrolysis purposes for 2 hours at 60–70° C. The substance was again screened and brownish yellow resin grains were obtained.

The resin was reduced in alkali with dithionite or sodium borhydride (in the presence of potassium ions), whereby it acquired a dark red color, and was washed with the reducing agent until all soluble fractions, recognizable from their red color, were removed. The resin was then washed free from reducing agent and acidified, becoming green in color. Oxidation was effected by means of ferric ions in twice-normal sulfuric acid; the use of ferric ions in twice-normal hydrochloric acid had a degrading action. The air-dried resin had a water content of 30 percent. The sulfonated copolymers (degree of sulfonation=1) are set out in the following Table 2 have the indicated cation exchanger capacities. The redox properties are given by the redox capacity with respect to ferric ions. The redox action is apparent from the redox normal potential, which is at about $E_0 = 175$ mV., as shown by titratiion wth ceric ions.

TABLE 1

| No. | Molar ratio divinyl benzene, ethyl styrene/vinyl anthraquinone | Quantity of crosslinking agent in mol. percent | Redox capacity mequiv./g. dry resin | |
|---|---|---|---|---|
| | | | Theoretical | Observed |
| 1 | 10:1 | 12.5 | 0.95 | 0.95±0.03 |
| 2 | 3:1 | 6.0 | 2.50 | 2.54±0.07 |
| 3 | 2:1 | 6.0 | 3.3 | 3.21±0.02 |
| 4 | 1:1 | 8.0 | 4.75 | 4.72±0.03 |
| 5 | 1:1 | 6.0 | 4.75 | 4.29±0.07 |
| 6 | 1:1 | 4.0 | 4.75 | 4.11±0.13 |

In the oxidized form, the resins show the following cation exchanger capacities:

TABLE 2

| No. | Exchange capacity in mequiv./g. of dry resin |
|---|---|
| 1 | 4.491±0.002 |
| 2 | 3.563±0.003 |
| 3 | 3.080±0.003 |
| 4 | 2.021±0.003 |
| 5 | 2.042±0.003 |
| 6 | 2.084±0.004 |

A copolymer of the same composition as copolymer No. 1 and with a sponge structure had a cyclohexane absorption power of 2.8 ml./g.

After sulfonation, it had the following capacities in comparison with the sulfonated copolymer No. 1:

TABLE 3

| No. | Redox capacity in mequiv./g. | | Water content, percent | Exchange capacity |
|---|---|---|---|---|
| | Theoretical | Observed | | |
| 7 | 0.95 | 1.08±0.02 | 67.2 | 4.371±0.005 |
| 1 | 0.95 | 0.95±0.03 | 49.6 | 4.491±0.002 |

All the resins described show a rapid ion exchange, as is known in connection with the usual exchangers. The redox process, on the contrary, is much slower. The reduction, e.g. with alkali dithionite or with alkali boron hydride, particularly in the presence of potassium ions, takes place comparatively quickly and can easily be recognized from the dark red coloring. After 24 hours, it is quantitatively complete. The quantitative oxidation proceeds much more slowly. About 60% of the capacity is reached after 2 hours and 80% of the capacity after 24 hours, whereas several weeks are necessary for complete oxidation.

Example 5

4.7 grams of 1-vinyl anthraquinone, 0.42 gram of divinyl benzene, 0.275 gram of ethyl styrene and 1.30 grams of styrene were sealed in vacuo in a glass ampoule with 10 ml. of freshly distilled dimethyl sulfoxide after repeated degasification and dissolved at 140° C. The solution was thereafter heated for 165 hours to 140° C. in a drying chamber. After cooling, the dark brownish red, hard rod obtained was comminuted, completely extracted in a Soxhlet apparatus with methanol and the brownihs yellow pieces were dried in vacuo at 50° C. The now hard and brittle product was broken and screened.

What is claimed is:
1. A process for the production of cross-linked resins from vinyl anthraquinones comprising polymerizing
   (a) a 2-vinyl anthraquinone or a 1-vinyl anthroquinone component with
   (b) a copolymerizable aromatic monovinyl compound in the presence of
   (c) a cross-linking aromatic polyvinyl monomer, the polymerization step being effected in dimethyl-sulfoxide at a temperature of about 100° C. to about 200° C., and recovering the resulting cross-linked insoluble resin from the polymerization medium.
2. The process according to claim 1, wherein said monovinyl compound is styrene.
3. The process according to claim 1, wherein said monovinyl compound is ethyl styrene.
4. The process according to claim 1, wherein said monovinyl compound is α-methyl styrene.
5. The process according to claim 1, wherein said cross-linking monomer is divinyl benzene.
6. A process for the production of cross-linked resins from vinyl anthraquinones which comprises polymerizing a 1- or 2-vinyl anthraquinone together with a copolymerizble aromatic monovinyl compound in the presence of an aromatic divinyl or trivinyl cross-linking monomer, said polymerizing being effected in dimethylsulfoxide at a temperature from about 100° to about 200° C. in the presence of an organic peroxide, and recovering the resulting cross-linked insoluble resin from the polymerization medium.
7. The process according to claim 6, wherein said organic peroxide is benzoyl peroxide.
8. A process for the production of cross-linked resins from 1- or 2-vinyl anthraquinones comprising polymerizing
   (a) the vinyl anthraquinone component with
   (b) a copolymerizable aromatic divinyl or polyvinyl monomer, the polymerization being effected in dimethyl sulfoxide at a temperature of about 100° C. to about 200° C., recovering a homogeneous stable cross-linked insoluble resin from the polymerization medium, and thereafter introducing cation-exchange groups into the resulting cross-linked resin.
9. The process according to claim 8, wherein sulfonic acid groups are introduced into the formed cross-linked resin.
10. A process for the production of cross-linked results from 1- or 2-vinyl anthraquinones comprising polymerizing the vinyl anthraquinone component together with a copolymerizable aromatic monovinyl compound in the presence of a cross-linking aromatic divinyl or polyvinyl monomer, said polymerization being effected in dimethyl sulfoxide at a temperature of about 100° to about 200° C. in the presence of a an organic non-polymerizable solvent, which solvent having no substantial solubilizing effect on the resulting copolymers, and recovering the resulting cross-linked insoluble resin from the polymerization medium.

11. The process of claim 10 comprising introducing cation exchange groups on the insoluble resin recovered.

12. The process of claim 10 comprising introducing sulfonic acid groups on the product of claim 10.

13. The product obtained according to claim 10.

14. The process of claim 10 wherein the polymerization is effected in the presence of a catalytic amount of peroxide.

15. The product obtained according to claim 14.

16. The cross-linked insoluble resin obtained according to claim 1.

17. The cross-linked insoluble redox ion exchange resin obtained according to claim 8.

18. A process according to claim 10, wherein said organic monomeric solvent is butyl acetate.

References Cited

G. Manecke et al. Chem Abstracts, vol. 56, pp. 7235c–7236, April 1962.

JOSEPH L. SCHOFER, *Primary Examiner.*

D. K. DENENBERG, *Assistant Examiner.*